United States Patent
Bruzzo

(10) Patent No.: US 7,222,495 B2
(45) Date of Patent: May 29, 2007

(54) MOTOR VEHICLE COOLING AND DEPOLLUTING DEVICE

(75) Inventor: Vitale Bruzzo, Vicenza (IT)

(73) Assignee: Ecoclim SA, Sion (CH)

( * ) Notice: Subject to any disclaimer, the term of this patent is extended or adjusted under 35 U.S.C. 154(b) by 208 days.

(21) Appl. No.: 10/513,617

(22) PCT Filed: Feb. 3, 2003

(86) PCT No.: PCT/IB03/00344

§ 371 (c)(1),
(2), (4) Date: May 16, 2005

(87) PCT Pub. No.: WO03/095809

PCT Pub. Date: Nov. 20, 2003

(65) Prior Publication Data

US 2005/0198983 A1    Sep. 15, 2005

(30) Foreign Application Priority Data

May 10, 2002    (EP) .................................. 02010583

(51) Int. Cl.
F25B 27/00    (2006.01)
(52) U.S. Cl. .................................... 62/238.3
(58) Field of Classification Search ............... 62/238.3, 62/239, 333, 271, 338, 112, 323.2, 476, 690; 237/12.3
See application file for complete search history.

(56) References Cited

U.S. PATENT DOCUMENTS

| | | | | |
|---|---|---|---|---|
| 2,418,446 A | * | 4/1947 | Anderson | .................... 62/50.2 |
| 3,953,983 A | * | 5/1976 | Sander | ........................... 62/79 |
| 4,240,267 A | * | 12/1980 | Shaw | ........................ 62/238.7 |
| 4,253,310 A | * | 3/1981 | Sokolov | ........................... 62/79 |
| 4,285,211 A | * | 8/1981 | Clark | ........................... 62/335 |
| 4,309,877 A | * | 1/1982 | Tawse | ........................ 62/238.1 |
| 4,516,402 A | * | 5/1985 | Chang | ........................... 60/656 |
| 4,754,805 A | * | 7/1988 | Rothmeyer | ............ 165/104.12 |
| 4,890,463 A | * | 1/1990 | Cantoni | ..................... 62/238.3 |

(Continued)

FOREIGN PATENT DOCUMENTS

JP    9-170846 A    *    6/1997

*Primary Examiner*—Mohammad M. Ali
(74) *Attorney, Agent, or Firm*—Kirkpatrick & Lockhart Preston Gates Ellis LLP

(57) ABSTRACT

The invention concerns a motor vehicle cooling and depolluting device designed for conditioning said vehicle passenger compartment and for cooling its cylinder block (22). The elements of the device are connected through a main tube (25) containing an antifreeze liquid. The device also comprises a temperature and pressure control valve (17), to maintain a constant pressure in the cylinder block (22) and located downstream of the cylinder block (22), a ventilated water-air exchanger (6) enabling a motor vehicle passenger compartment to be cooled, a ventilated water-air exchanger (1) enabling a motor vehicle engine compartment to be cooled, at least a cold water tank (3) for cooling upon start-up of the motor vehicle and located between the ventilated water-air exchanger (6) and the evaporator (24) and a solenoid valve (9) for controlling the temperature inside the motor vehicle passenger compartment and located downstream of the ventilated water-air exchanger (6). A water-fume exchanger (21), located downstream of a water-fume exchanger (20), serves to depollute the exhaust gases of an engine (18) by cooling said exhaust gases and condensing its hydrocarbon residues as well as by trapping the particles of said exhaust gases.

11 Claims, 2 Drawing Sheets

U.S. PATENT DOCUMENTS 5,181,387 A * 1/1993 Meckler .................... 62/59
5,327,987 A * 7/1994 Abdelmalek ............... 180/65.2
5,722,249 A * 3/1998 Miller, Jr. .................. 62/238.2
2001/0042377 A1* 11/2001 Pozivil ...................... 62/48.3

* cited by examiner

MOTOR VEHICLE COOLING AND DEPOLLUTING DEVICE

The present invention relates to the field of motor vehicles, more particularly to devices for cooling, air-conditioning and depollution inside a motor vehicle.

A system which cools does not produce cold, it removes heat. Schematically, said system generally operates in the following way:

In a closed circuit, a coolant (liquid/gas) passes through four components, a compressor, a condenser, an expansion valve (or restrictor) and an evaporator. The compressor takes in the vaporized gas and compresses it, thus increasing its pressure and consequently its temperature. The vapor gas at high temperature and pressure is sent to the condenser (which is actually an exchanger), in which gives up its heat by virtue of a gas/air or gas/water or gas/oil exchange and becomes a liquid, which has lowered its temperature but kept its pressure.

The fluid which is produced continues on its way to an expansion valve (or restrictor), through which it is vaporized and relaxed. It thus loses its pressure and lowers its temperature significantly. The vaporized liquid is then sent to the evaporator (which again is an exchanger), in which it extracts heat from the element that we wish to "cool". The vaporized liquid laden with the heat which it has extracted is sent to the compressor, and the cycle is repeated until a thermostat makes the compressor stop. It should be noted that the coolants most often used are of the CFC type, such as R22, and of the HFC type, such as R134A.

In a vehicle, the aforementioned system is installed in the following way:

The compressor is installed with a clutch system on the crankshaft of the engine. The clutch is actuated by a thermostat according to the air-conditioning requirements. The condenser is installed at the front of the vehicle in the engine compartment, forward of the radiator of the automobile, and it is cooled by the fan of the radiator. The evaporator is installed in the passenger compartment, between the driver and the front-seat passenger. A ventilation system circulates the air over the evaporator so that it is recycled, giving up heat, odor and humidity.

The described system is a modified and improved derivative of the Carnot cycle and, when it is used, causes up to 17% extra fuel consumption.

The aforementioned principle is that of refrigeration, likewise applied when referring to conditioned air.

The vast majority of motor vehicles are currently provided with conditioned air. This is a device for comfort and safety, and it is controlled manually or automatically in order to cool the passenger compartment of a vehicle.

Cooling is not the only function of the conditioned air. It is also used to reduce the relative humidity, and to remove smoke as well as dust and odors. It provides better visibility by rapidly demisting the windows, and it keeps the driver in a constant and pleasant atmosphere which limits driving stress. It is therefore a genuine contributing factor to road safety, the operating principle of which is based on the circulation of a coolant subjected to a compression-expansion cycle, as seen above.

Devices which are of a similar type, but which use absorption, are described in the prior art, particularly in Document U.S. Pat. No. 5,383,341. That document describes a refrigeration system whose energy is provided by the exhaust gases. That system only relates to use of the energy generated by the exhaust gases, which thermal energy is used for the production of cold that is used to air-condition the passenger compartment. It should be pointed out that Publication WO 01/18366 advantageously proposes a device for depolluting the combustion gases and producing refrigerant energy by recovering the thermal energy of said gases, while Publication WO 01/18463 advantageously proposes a device for cooling by absorption, allowing cold to be generated as soon as the cooling system is turned on.

The conventional devices cool the engine with the aid of a fan on the radiator, as described above. These devices present the drawbacks of increasing the fuel consumption of the vehicle and of making the engine operate at high and unstable temperatures, requiring motor vehicle manufacturers to use electronic components that are expensive in the engine compartment, since they are subject to stringent standards.

It is an object of the present invention to provide a simple and economical system for cooling and stabilizing the temperature of the engine compartment of a motor vehicle, for air-conditioning the passenger compartment and for efficiently depolluting the exhaust gases.

This object is achieved by a device for cooling and depolluting a motor vehicle, which is intended for air-conditioning the passenger compartment of said vehicle and for cooling its engine block, and the elements of which are connected by a main tube containing an antifreeze fluid, for example water-glycol, comprising a pump, an absorber, a high-pressure generator, a low-pressure generator, a condenser, an evaporator, characterized in that it comprises a temperature-pressure regulating valve located downstream of the engine block, for maintaining a constant pressure/temperature in the part of the cooling circuit around the engine inside said engine block, thus preventing water from evaporating inside said part of the cooling circuit and making it possible to sustain cooling of said engine block.

According to the invention, the device cools the engine compartment and air-conditions the passenger compartment while depolluting the exhaust gases, and does so by virtue of the heat supply from the engine block and advantageously from the exhaust fumes of the engine as well, without extra fuel consumption.

The advantages of air-conditioning the passenger compartment of a motor vehicle are described above. Cooling the engine compartment also offers many advantages, including that of extending the life of all the mechanical and electronic parts located in said compartment.

A major advantage of the present invention, however, in view of the proliferation of the electronic components installed in the engine compartment, is that it is possible to use electronic components with less stringent standards, which leads to a cost reduction.

This is because the electronic components are no longer subjected to high-temperature stresses, since the temperature in the engine compartment is stabilized by a refrigeration device using the heat supply from the engine itself, and therefore less heat dispersed under the hood of the vehicle. It should be noted, as already mentioned, that the system advantageously uses the exhaust gases to heat the coolant.

A temperature-pressure control valve makes it possible to maintain a pressure of about 1.5 bar inside the engine block, thus preventing water from evaporating inside the engine. With the system, the cooling of the engine is more precise and stable than the traditional radiator-fan. It should be pointed out that the pressure in the rest of the system typically varies from about 8 mbar in the evaporator to about 175 mbar in the high-temperature generator, the temperature in turn varying from about 5/7° C. in the evaporator to about 130/135° C. in the high-temperature generator.

The coolant (in this case advantageously lithium bromide-water, in which the water is not an absorbent but a refrigerant that makes it possible to cool the engine compartment and air-condition the passenger compartment, and the lithium bromide is a salt which presents no danger when it is handled, contrary to the case with ammonia) operates in particular at a pressure below atmospheric pressure, which limits the problems of leaks commonly referred to as infiltrations in this context.

The invention will be understood more clearly from the detailed description which follows, with reference to the appended schematic drawings in which.

Figure 1:
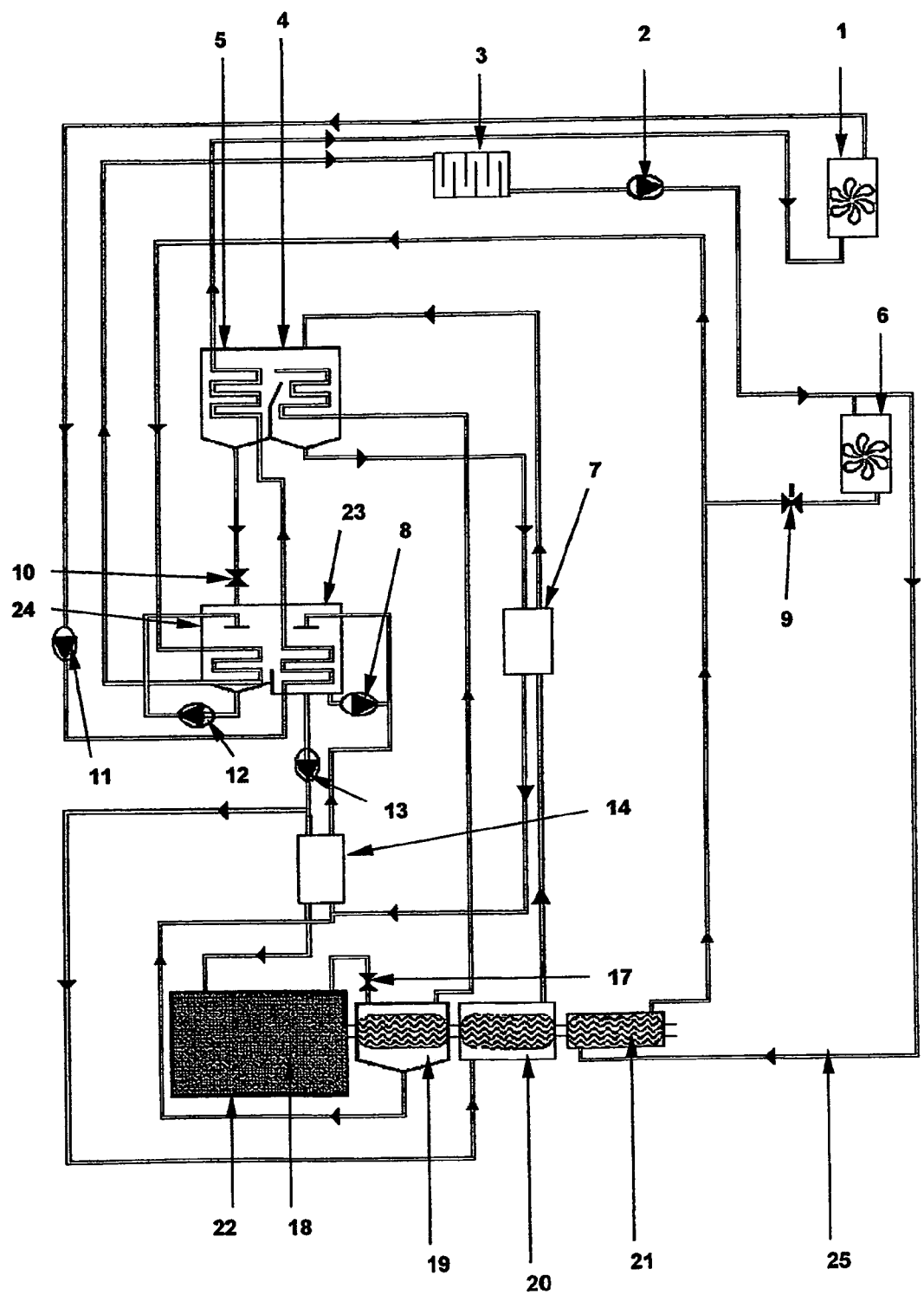
FIG. 1 represents by way of example a device for depolluting and air-conditioning the passenger compartment and the engine compartment of a motor vehicle, using the exhaust gases and the heat of the engine in order to heat a coolant.

According to the invention, and as shown in FIG. 1, the, elements of a circuit for cooling/air-conditioning the passenger compartment and the engine compartment of a motor vehicle are connected by a main tube (25) containing an antifreeze fluid for distributing the cold. It should be noted that a solution such as lithium bromide-water, for example, is used for producing the cold. Along the said circuit, a pump (13) receives this solution from an absorber (23), and sends one part of said solution to an engine (18) through a water-water exchanger (14) and another part to a water-fume exchanger (20). The part of the rich solution which passes through the water-water exchanger (14), where it starts to heat up from about 40° C. to about 85° C., then passes through the engine (18) of the vehicle, where it continues to heat up and changes from about 85° C. to about 100° C. The fluid arrives at a temperature-pressure regulating valve (17) which is used not only to regulate the temperature and the pressure (it needs to keep the temperature of the fluid between about 80° C. and about 105° C. and the pressure between about 0.98 bar and about 1.5 bar, so as to prevent boiling inside the engine), but also acts as an expansion valve and sprays the solution (which changes from a pressure of about 0.98 bar to about 175 mbar) into a high-pressure generator (19).

This high-pressure generator (19) therefore receives the solution that is sprayed, and superheated by virtue of the heat (up to about 400° C.) of the exhaust fumes of the engine (18), and brings the solution to about 130° C., evaporating a part of the water of the solution sending the vapor at about 130° C. to heat low-pressure generator (4), and the remaining liquid part (lean fluid) returns to the absorber (23) with water-water exchanger (14) after having been mixed with the lean fluid coming from the low-pressure generator (4).

The rich fluid which leaves the pump (13) is sent to the water-fume exchanger (20). This rich fluid heats up in said water-fume exchanger (20) and changes from about 40° C. to about 60° C., and is then sent to a water-water exchanger (7) where it continues to heat up, changing from about 60° C. to about 85° C., before ending up in the low-pressure generator (4) where it continues to heat up to about 95° C., while partly evaporating.

The vapor is then sent to a condenser (5) where it is condensed. The remaining liquid part (lean solution) passes through the water-water exchanger (7) where it starts its cooling (from about 95° C. to about 70° C.) and, after having been mixed with the lean solution which comes from the high-pressure generator (19), it passes through the water-water exchanger (14) where it cools further (from about 70° C. to about 50° C.) before returning to the absorber (23).

The condenser (5) receives the vapor from the low-pressure generator (4) and that from the high-pressure generator (19). Before arriving at the condenser (5), the vapor coming from the high-pressure generator (19) will already have heated the low-pressure generator (4). The condenser (5) converts the 2 sources of vapor into liquid (pure water). From the condenser (5), where a pressure of about 80 mbar prevails, the pure water is sent to a lamination (or expansion) valve (10) which vaporizes it in an evaporator (24) where we have a pressure of about 8 mbar and a temperature of about 6° C.

The evaporator (24) is in fact vaporized water-water exchanger equipped with an air circulator (12), the purpose of which is to cool the liquid that comes from an air-water exchanger (6) located in the passenger compartment of the vehicle, the liquid of which will be moved by a water circulator (2).

The absorber (23) receives the vaporized pure water which comes from the evaporator (24) as well as the solution, lean with respect to water, which comes from the high-pressure generator (19) and from the low-pressure generator (4). The lithium bromide of the lean solution absorbs the vaporized pure water and the cycle is repeated.

The absorber (23) and the condenser (5) are cooled by a liquid which comes from an air-water exchanger (1), the liquid of which circulates by virtue of a water circulator (11).

It should also be noted that the system has a cold water reservoir (3) located between the water-ventilated air exchanger (6) and the evaporator (24), which makes cooling possible as soon as the motor vehicle is started.

The water-ventilated air exchanger (6) air-conditions the passenger compartment in the traditional way while, according to the invention, the water-ventilated air exchanger (1) cools the engine compartment of the vehicle to about 50° C.–60° C., avoiding both excessively cold air (counterproductive for the engine) and excessively hot air from the radiator and from the engine (counterproductive for the electronic equipment, inter alia).

A solenoid valve (9) regulates the temperature inside the passenger compartment.

An air-fume exchanger (21) located downstream of the air-fume exchanger (20), is used to depollute the exhaust gases of the engine (18) by cooling said exhaust gases and by condensing its hydrocarbon residues, and by trapping the particles of said exhaust gases.

Figure 2:
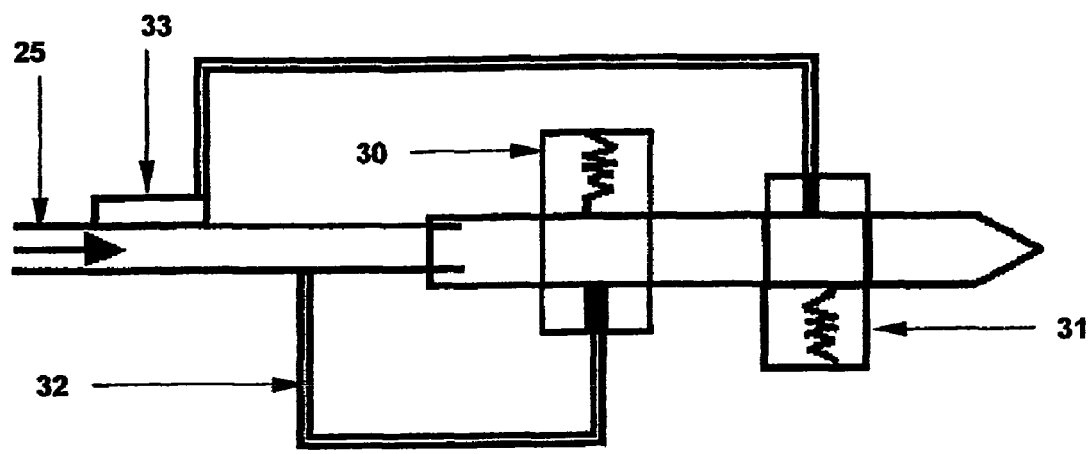
FIG. 2 represents by way of example a pressure-temperature control valve of the device in FIG. 1, in its completely closed position.
Figure 3:
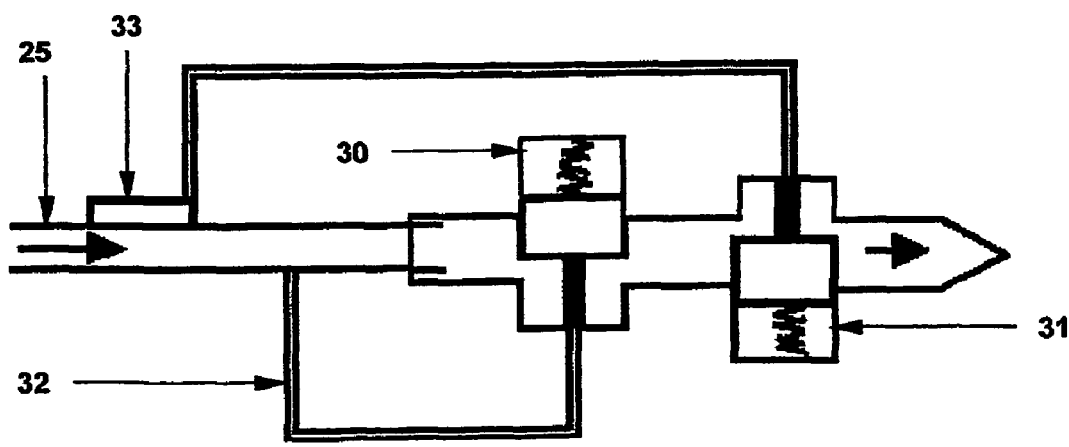
FIG. 3 represents this pressure-temperature control valve when it starts to open.

The valve (17) (FIG. 2 and FIG. 3) is formed by a valve body (30) which measures the pressure through a tube (32) connected to the main tube, and by a thermostatic valve body (31) which reacts to the temperature variations by virtue of a bulb (33).

The valve body (30) is completely closed at 1 atm, allowing the pressure to increase. It starts to open (see FIG. 3) when the pressure is about 1.1 atm, and the pressure valve body (30) is completely open when the pressure reaches the maximum pressure of about 1.5 atm.

The thermostatic valve body (31) starts to open at about 95° C. (FIG. 3), and it is completely open at about 105° C. The pressure and the temperature are controlled perfectly (about 1 atm, about 95° C.) inside an engine block (22) by this double opening of the valve (31).

It should be noted that water boils at about 40° C. when the pressure is 80 mbar. The temperature-pressure regulating valve (17) consequently makes it possible to maintain a constant pressure/temperature in the part of the cooling circuit lying between the engine block (22) and the engine (18), thus preventing water from evaporating inside said part of the cooling circuit and making it possible to sustain cooling of the engine compartment of the motor vehicle.

The invention claimed is:

1. A device for cooling and depolluting a motor vehicle, which is intended for air-conditioning the passenger compartment of said vehicle and for cooling its engine block (22), and the elements of which are connected by a main tube (25) containing an antifreeze fluid, comprising a pump (13), an absorber (23), a high-pressure generator (19), a low-pressure generator (4), a condenser (5), an evaporator (24), characterized in that it comprises a temperature-pressure regulating valve (17) located downstream of the engine block (22), for maintaining a constant pressure/temperature in the part of the cooling circuit around the engine (18) inside said engine block (22), thus preventing water from evaporating inside said part of the cooling circuit and making it possible to sustain cooling of said engine block (22).

2. The device for cooling and depolluting a motor vehicle as claimed in claim 1, characterized in that the temperature-pressure regulating valve (17) includes a pressure valve (30) which opens as soon as the downstream pressure increases.

3. The device for cooling and depolluting a motor vehicle as claimed in claim 2, characterized in that the pressure valve body (30) of temperature-pressure regulating valve (17) closes as soon as the downstream pressure decreases.

4. The device for cooling and depolluting a motor vehicle as claimed in claim 1, characterized in that the temperature-pressure regulating valve (17) includes a thermostatic valve body (31) which opens as soon as the downstream temperature increases.

5. The device for cooling and depolluting a motor vehicle as claimed in claim 4, characterized in that the thermostatic valve body (31) of the temperature-pressure regulating valve (17) closes as soon as the downstream temperature decreases.

6. The device for cooling and depolluting a motor vehicle as claimed in claim 1, characterized in that it comprises a water-ventilated air exchanger (6) which is intended for the air-conditioning of a motor vehicle passenger compartment and is located inside said passenger compartment.

7. The device for cooling and depolluting a motor vehicle as claimed in claim 1 characterized in that it comprises a water-ventilated air exchanger (1) for the cooling the motor vehicle engine compartment, which is located inside said engine compartment.

8. The device for cooling and depolluting a motor vehicle as claimed in claim 6, characterized in that it comprises at least one cold water reservoir (3) which pennits cooling as soon as the motor vehicle is started and which is located between the water-ventilated air exchanger (6) and the evaporator (24).

9. The device for cooling and depolluting a motor vehicle as claimed in claim 6, characterized in that it comprises a solenoid valve (9) for regulating the temperature inside the passenger compartment of the motor vehicle, which is located downstream of the water-ventilated air exchanger (6).

10. The device for cooling and depolluting a motor vehicle as claimed in claim 1, characterized in that it comprises a water-fume exchanger (21) located downstream of a water-fume exchanger (20), which is used to depollute the exhaust gases of the engine (18) by cooling said exhaust gases and by condensing its hydrocarbon residues, and by trapping the particles of said exhaust gases.

11. The device for cooling and depolluting a motor vehicle as claimed in claim 1, characterized in that the coolant is a lithium bromide-water solution.

* * * * *